May 14, 1957  G. A. GRUBB  2,791,892
COOLING UNIT FOR ABSORPTION REFRIGERATION APPARATUS
Filed Dec. 6, 1954  2 Sheets-Sheet 2
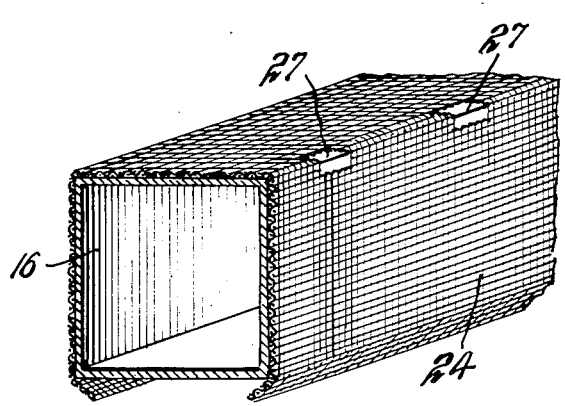
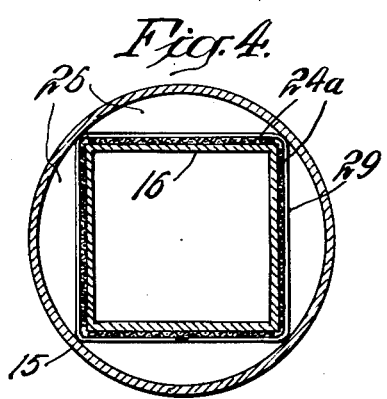
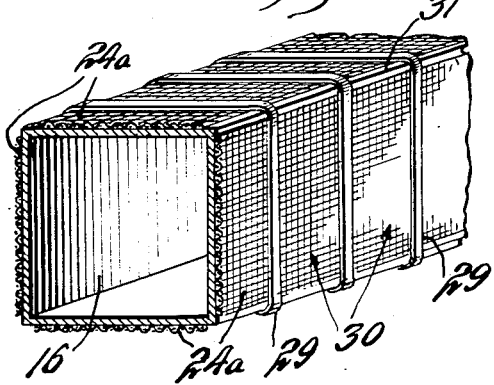
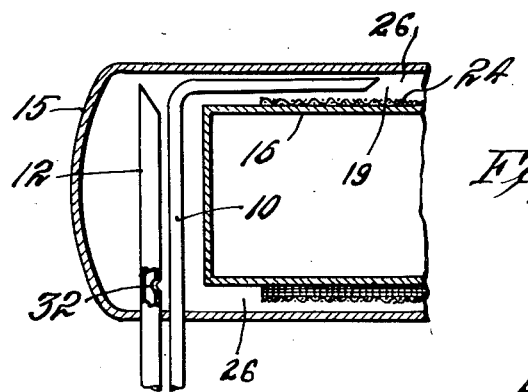
INVENTOR.
ATTORNEY

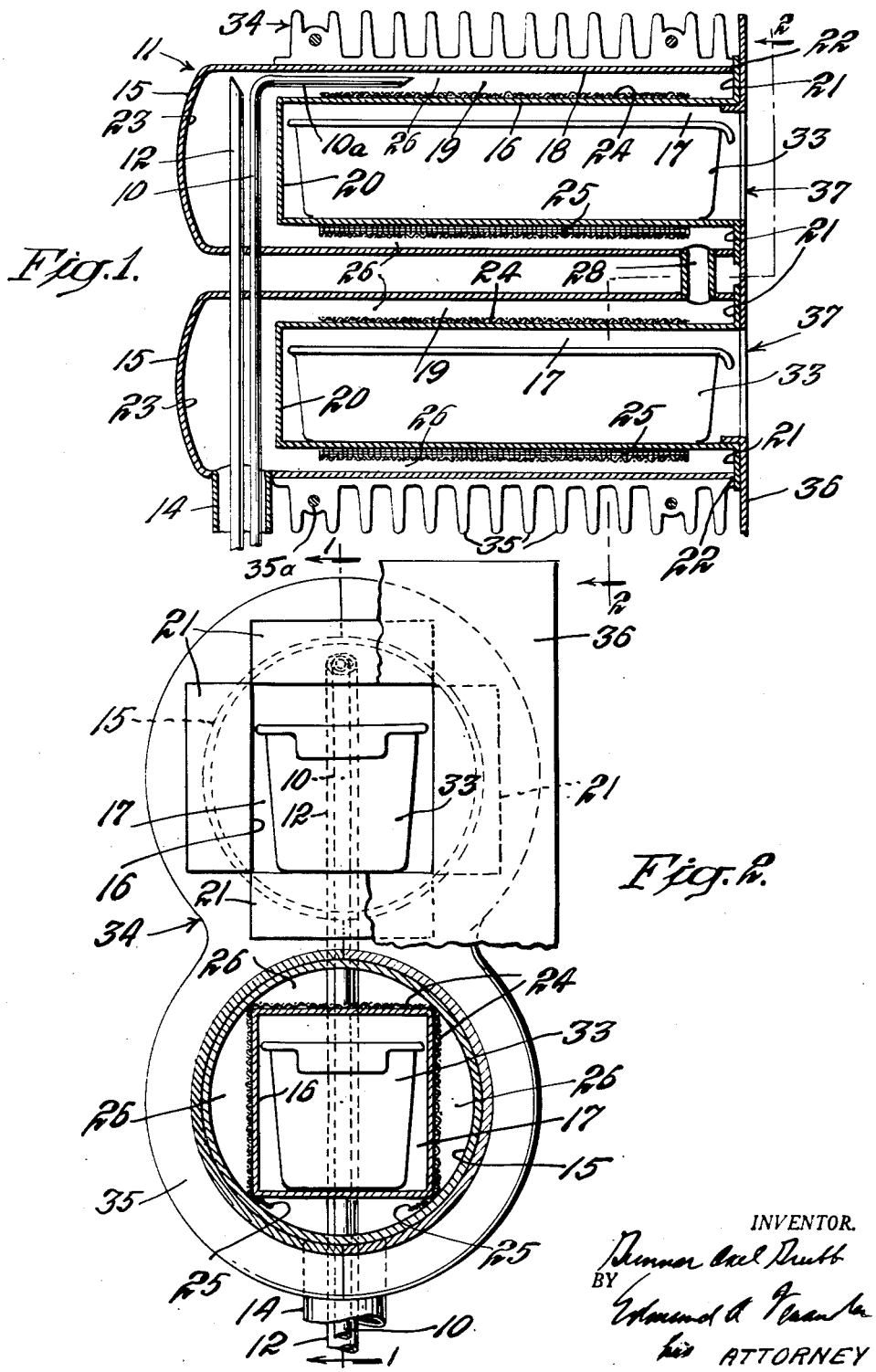

United States Patent Office 2,791,892
Patented May 14, 1957

2,791,892

COOLING UNIT FOR ABSORPTION REFRIGERATION APPARATUS

Gunnar Axel Grubb, Bromma, Sweden, assignor to Aktiebolaget Elektrolux, Stockholm, Sweden, a corporation of Sweden Application December 6, 1954, Serial No. 473,340

Claims priority, application Sweden December 9, 1953

5 Claims. (Cl. 62—119.5)

My invention relates to refrigeration, and more particularly to cooling units or evaporators for absorption refrigeration apparatus of the kind containing an inert gas.

In refrigerators of the household type, the evaporator or cooling unit often is arranged in a thermally insulated storage space and provides refrigeration both for making ice cubes and the like and for maintaining the air in the space at a desired low temperature for properly preserving foods.

It is an object of my invention to provide a double-walled cooling unit or evaporator for absorption refrigeration apparatus of the inert gas type which will effectively conduct heat from trays adapted to contain water to be frozen and also present an efficient heat transfer surface for cooling air flowing in contact therewith.

The above and other objects and advantages of the invention will become apparent from the following description taken in conjunction with the accompanying drawing forming a part of this specification, and of which:

Fig. 1 is a vertical sectional view, taken at line 1—1 of Fig. 2, of a cooling unit or evaporator embodying the invention;

Fig. 2 is a view, taken at line 2—2 of Fig. 1, to illustrate details more clearly; and Figs. 3, 4, 5 and 6 are fragmentary views illustrating modifications of the invention.

The present invention is embodied in absorption refrigeration apparatus of a uniform pressure type containing an inert pressure equalizing gas. Refrigerant vapor is expelled from absorption liquid in a boiler or generator by heating and flows to a condenser. The refrigerant, such as ammonia, is liquefied in the condenser and flows by gravity through a conduit 10 to a cooling unit 11 into which an inert gas also flows through a conduit 12. In the cooling unit 11 the liquid refrigerant evaporates and diffuses into the inert gas, such as hydrogen, to produce a refrigerating effect. The resulting gas mixture of refrigerant and inert gas flows from the cooling unit 11 through a conduit 14 to an absorber.

In the absorber refrigerant is absorbed from the gas mixture into absorption liquid, such as water. The inert gas returns from the absorber to the cooling unit 11 in a path of flow including the conduit 12, and the enriched absorption liquid is conducted from the absorber to the generator or boiler. The weakened absorption liquid from which refrigerant vapor has been expelled is conducted from the generator to the absorber to absorb refrigerant vapor. In order to simplify the drawing, the generator or boiler, condenser, absorber and connections therefor have not been shown, such parts being well known and their illustration not being necessary for an understanding of my invention. While the cooling unit 11 has been shown apart from a household refrigerator cabinet, it also will be understood that the cooling unit normally is disposed in a thermally insulated interior of such a refrigerator cabinet.

In accordance with my invention, the cooling unit 11 is formed of one or several evaporator sections 15 disposed alongside one another in any suitable manner, two such evaporator sections 15 being shown disposed one above the other in the preferred embodiment illustrated in the drawing. Each evaporator section 15 comprises a double-walled vessel having an inner wall member 16 of annular form defining a freezing space 17, and an outer wall member 18 of annular form which is disposed about the inner wall member 16 and forms therewith an evaporating chamber 19.

The inner wall members 16 are in the form of open-ended vessels having closed ends 20 and outwardly extending flanges 21 at the opposite open ends to which the forward ends of the outer wall members 18 are secured at 22, as by welding, for example. The outer wall members 18 desirably are of cylindrical form and also formed with closed ends 23 which are spaced from the closed ends 20 of the inner wall members 16 to provide adequate space at the rear of the evaporating chambers 19 to receive the conduits 10 and 12, respectively.

As best shown in Fig. 2, the inner wall member 16 of each evaporator section 15 is essentially square in transverse section and snugly fits within the outer cylindrical wall member 18. Suitable material 24 is disposed about each inner wall member 16 to promote distribution of liquid refrigerant in the evaporating chambers 19. By way of example, the material 24 may be wire mesh or screening of a character which will promote spreading of liquid refrigerant by capillary action and gravity.

In each of the evaporator sections 15 the liquid spreading material 24 overlies the top and side walls of the inner wall members 16 and the bottom edges 25 simply depend and hang down from the bottom corners of the inner wall members 16, as shown in Fig. 2. However, the liquid distributing material 24 also may be arranged to extend over and in intimate contact with the bottom walls of the inner wall members 16. Since the outer wall members 18 are of cylindrical form and the inner wall members 16 are rectangular in transverse section and snugly fit within the outer wall members, each of the corners of the inner wall members 16 more or less rests and is supported at the inner surface of an outer wall member. In this way, each evaporating chamber is divided into four passages 26 which extend axially of the inner and outer wall members 16 and 18, respectively.

Since the liquid spreading material passes around each of the corners of the inner wall members 16, inert gas can pass fom each passage 26 to adjacent passages 26. This is particularly true when the liquid spreading material 24 is formed of open wire mesh or screening, for example. In the event the wire mesh or screening is of such a character that there is a tendency to block off the flow of gas completely at the corners of the inner wall members 16 by liquid being distributed in the screening, the liquid spreading material 24 may be formed with spaced apart openings 27 at the regions of the corners of the inner wall members, as shown in Fig. 3, to permit inert gas to flow from one passage 26 to an adjacent passage 26 in the evaporating chambers 19.

Liquid refrigerant, which flows by gravity from the condenser, enters the top evaporator section 15 through conduit 10 which includes a part 10a extending forwardly in the top evaporating chamber 19. The liquid refrigerant is discharged from the conduit section 10a onto the liquid spreading material 24 of the top evaporator section 15. In this way, liquid refrigerant is distributed by capillary action and gravity about the top and sides of the inner wall member 16 of the top evaporating chamber 19. The liquid refrigerant distributed by the material 24 in the top evaporating chamber 19 evaporates and diffuses into inert gas which is introduced in the top evaporator section 15 through the conduit 12, thus producing refrigeration and abstracting heat from the surroundings.

Inert gas partially enriched in refrigerant flows from the top evaporator section 15 through a connecting conduit 28 into the upper part of the bottom evaporator section 15. Unevaporated liquid refrigerant also passes by gravity from the bottom passage 26 of the top evaporating chamber 19 through the conduit 28 onto the liquid distributing material 24 of the bottom evaporating chamber 19. Liquid refrigerant evaporates and diffuses into the inert gas in the bottom evaporating chamber 19 to produce additional refrigeration in this part of the cooling unit 11. The resulting gas mixture of refrigerant and inert gas flows from the bottom evaporator section 15 through the conduit 14 to the absorber, as described above.

The circulation of inert gas in the gas circuit, which includes the cooling unit 11, is due to the difference in specific weight of the columns of gas, rich and weak, respectively, in refrigerant vapor. Since the rich gas is heavier than the weak gas, force is produced within the system for causing flow of rich gas through conduit 14 toward the absorber and flow of weak gas through conduit 12 toward the cooling unit 11. Since the inert gas introduced into the cooling unit 11 through conduit 12 becomes progressively richer in refrigerant vapor while flowing in the presence of the liquid refrigerant, force is produced within the top and bottom evaporator sections 15 to cause flow of rich gas toward the absorber.

Since the weak gas is introduced into the top evaporator section 15 through conduit 12 into the upper rear part of the evaporating chamber 19, and partially enriched gas passes from the top evaporating chamber 19 through the connecting conduit 28, the inert gas generally will flow through the top evaporating chamber 19 from the upper rear part thereof to the bottom forward part at the region conduit 28 is connected thereto. Likewise, the inert gas generally will flow through the bottom evaporating chamber 19 from the upper forward part thereof to the bottom rear part thereof at the region conduit 14 is connected thereto. However, the inert gas actually will flow in a multiplicity of flow paths through each of the evaporator sections 15. As the inert gas becomes enriched in refrigerant vapor and tends to move downwardly in the evaporating chambers 19, such gas not only tends to move axially of the top or uppermost passages 26 in the evaporating chambers, but also downwardly through the gaps between the inner wall surfaces of the outer cylindrical wall members 18 and the corners of the inner square-shaped wall members 16. Hence, as mentioned above, the wire screening or other liquid distributing material 24 may be formed with spaced apart openings 27 at the corner regions of the inner wall members 16, as shown in Fig. 3, to provide ample flow paths for inert gas in the event the material 24 otherwise is of such a character that a continuous liquid film will be formed at the corners of the inner wall members 16 and tend to block off flow of inert gas at such regions.

Open gaps between the axially extending passages 26 may be provided in a number of ways to insure downward flow of inert gas in all parts of the evaporating chambers 19. While conduit connections may be provided between adjacent passages 26 of the evaporating chambers 19, the same result can be achieved by winding a wire 29 of suitable size about liquid distributing material 24a, as shown in Figs. 4 and 5, which will hold the latter in place and also position the inner wall members 16 in spaced relation with the inner wall surfaces of the outer cylindrical wall members 18. With such arrangement, the individual turns of the wire 29 serve as spacer elements between the corners of the inner wall members 16 and the inner surfaces of the outer wall members 18, and the gaps 30 between adjacent turns of the wire provide paths of flow for inert gas between the axially extending passages 26.

When the wire 29 is wound about the liquid distributing material in the manner just described, the liquid distributing material may be placed in sections of panels 24a at the sides of the inner wall members 16, as illustrated in Figs. 4 and 5, so that the corner regions 31 are bare and not covered with the distributing material. In such case, a good heat conductive connection is provided between the corners of the inner wall members 16 and the outer wall members 18 through the wire 29 wound about the inner wall members. Accordingly, the wire 29 wound about the liquid distributing material 24a can be effectively employed to regulate the distribution of cooling effect produced in the evaporating chambers 19 between the freezing spaces 17 and the outer wall members 18. By increasing or decreasing the heat conductive connection effected through the wire or metal tape 29 wound about the liquid distributing material, as by changing the number of turns of the wire or the size of the metal tape, for example, the part of the cooling effect produced in the evaporating chambers 19 and transmitted to the outer wall members 18 can be nicely controlled.

The construction of the evaporator section 15 is such that inert gas may be directed in any one of several ways through the individual passages 26. Hence, the inert gas may be caused to flow serially through the passages 26 or in parallel through the passages. When parallel flow of inert gas through the passages 26 is desired, an opening 32 may be provided in the conduit 12 at the bottom part of the top evaporating chamber 19, as seen in Fig. 6, so that some weak inert gas flowing through conduit 12 will be diverted into the bottom passage 26 of the top evaporating chamber 19 in parallel flow with the inert gas passing from the upper end of conduit 12 into the top passage 26.

In Figs. 1 and 2 it will be seen that shallow trays 33, adapted to contain water to be frozen, are positioned in the freezing spaces 17. Each tray 33, the width of which approaches the width of a freezing space 17, is supported on the flat bottom surface of an inner wall member 16 and more or less occupies and takes up the entire storage capacity of a freezing space 17, there being only sufficient height above the tray to allow the latter to be lifted when it is necessary to break an ice bond between the tray and its supporting surface. Hence, since 80% or more of the cross-sectional area of each freezing space 17 is effectively taken up by a tray 33, the contact area between the tray bottom and the flat bottom of each square-shaped inner wall member 16 will be at a maximum for transmitting cooling effect to the tray; and at the same time the distance between each tray and the side walls and ceiling of a freezing space will be relatively small, so that the cooling of the tray and its contents will be extremely intensive.

Intensive cooling of ice trays in the manner just described is particularly desirable in household refrigerators of small size in which the cooling units are relatively small. In such cooling units the freezing space is small in size of necessity and can accommodate only one or two ice trays at the most, as illustrated in Figs. 1 and 2. Even though only one ice tray can be inserted in each freezing space 17, the fact that good thermal contact is effected between the tray and the flat bottom of the square-shaped inner wall member 16, and the tray is housed in an enclosure in which the cooling effect produced is very intensive, makes it possible to produce a reasonable quantity of ice and at the same time enables the cooling unit 11 to be effectively employed to cool the thermally insulated interior of a household refrigerator cabinet in which it is adapted to be positioned.

In order to provide an extensive heat transfer surface for cooling air in the thermally insulated interior of a household refrigerator cabinet, a suitable shell 34 formed with fins 35 may be secured in good thermal contact with the outer cylindrical wall members 18. The shell 34 may be formed of two parts adapted to be connected together at 35. A suitable front baffle plate 36, which is fixed to the front of the cooling unit 11 in any suitable manner, is provided with openings 37 through which access may be had to the freezing spaces 17.

Modifications of the embodiments of my invention which I have described will occur to those skilled in the art. For example, the evaporator sections 15 may be arranged in different positions with respect to one another and employed to transmit cooling effect to the same or different compartments of a household refrigerator cabinet. Further, the outer wall members 18 may be of elliptical form and the inner wall members rectangular in transverse cross section. Therefore, I desire my invention not to be limited to the particular arrangements set forth, and intend in the claims to cover all modifications which do not depart from the spirit and scope of the invention.

What is claimed is:

1. In absorption refrigeration apparatus employing an inert gas into which refrigerant evaporates, a double-walled evaporator having a multi-sided inner wall member defining a freezing space and an outer wall member disposed about said inner wall member and forming therewith an evaporating chamber, said chamber having an inlet and an outlet for circulation of inert gas therethrough, means for conducting refrigerant into said chamber for evaporation therein in the presence of the gas, said inner wall member having at least two spaced apart regions thereof resting against the inner surface of said outer wall member along lines extending lengthwise of the latter, the spaced apart regions of said inner wall member cooperating with said outer wall member to provide a plurality of passages extending lengthwise of said freezing space which form said evaporating chamber, means including liquid distributing material at the outer surface of said inner wall member to effect distribution of liquid refrigerant thereon, and said liquid distributing material having gaps at the spaced apart regions of said inner wall member which rest against the inner wall surface of said outer wall member, said gaps forming breaks in continuity of the liquid distributing material lengthwise of said inner and outer wall members.

2. An evaporator as set forth in claim 1 in which said inner wall member is formed with an essentially flat bottom side providing a surface for supporting thereon a tray containing matter adapted to be frozen.

3. In absorption refrigeration apparatus employing an inert gas into which refrigerant evaporates, a double-walled evaporator having an inner wall member defining a freezing space and an outer wall member of tubular form disposed about said inner wall member and forming therewith an evaporating chamber, said chamber having an inlet and outlet for circulation of inert gas therethrough, means for conducting refrigerant into said chamber for evaporation therein in the presence of the gas, said inner wall member being rectangular in transverse section and having at least the two bottom corners thereof forming spaced apart regions resting against the inner surface of said outer wall member along lines extending lengthwise of the latter to provide a plurality of passages extending lengthwise of said freezing space which form said evaporating chamber, means including liquid distributing material at the outer surface of said inner wall member to effect distribution of liquid refrigerant thereon, and means including metallic wire or tape wound about said liquid distributing material to position at least the bottom corners of said inner wall member in spaced relation with respect to the inner surface of said outer wall member, the gaps between adjacent turns of said wire or tape serving to provide gas communication between said axially extending passages.

4. An evaporator as set forth in claim 3 in which at least the bottom corner regions of said inner wall member are bare and said liquid distributing material is placed over regions of the outer surface of said inner wall member removed from said corner regions, said metallic wire or tape providing a good heat conductive path between such a bare corner of the inner wall member and the inner surface of said outer wall member.

5. An evaporator as set forth in claim 3 in which said inner wall member is formed with an essentially flat bottom side providing a surface for supporting thereon a tray containing matter to be frozen.

References Cited in the file of this patent

UNITED STATES PATENTS

| | | |
|---|---|---|
| 2,188,476 | Knight | Jan. 30, 1940 |
| 2,210,898 | Campbell | Aug. 13, 1940 |
| 2,239,178 | Conrady | Apr. 22, 1941 |
| 2,260,939 | Hainsworth | Oct. 28, 1941 |
| 2,651,923 | Stierlin | Sept. 15, 1953 |

FOREIGN PATENTS

| | | |
|---|---|---|
| 439,428 | Italy | Sept. 16, 1948 |
| 476,580 | Italy | Dec. 16, 1952 |
| 1,007,275 | France | May 5, 1952 |